(12) United States Patent
Cullen

(10) Patent No.: US 6,911,340 B1
(45) Date of Patent: Jun. 28, 2005

(54) METHOD AND MEANS FOR COMPOSTING ORGANIC MATERIAL BY NATURAL DRAFT

(75) Inventor: Steven R. Cullen, Astoria, OR (US)

(73) Assignee: SRC Innovations, LLC, Astoria, OR (US)

( * ) Notice: Subject to any disclaimer, the term of this patent is extended or adjusted under 35 U.S.C. 154(b) by 325 days.

(21) Appl. No.: 10/317,256

(22) Filed: Dec. 11, 2002

(51) Int. Cl.⁷ .............................................. C12M 1/00
(52) U.S. Cl. ................................................ 435/290.1
(58) Field of Search .......................... 435/286.6, 290.1, 435/818

(56) References Cited

U.S. PATENT DOCUMENTS

| | | |
|---|---|---|
| 1,857,762 A | 5/1932 | Meadows |
| 2,469,096 A | 5/1949 | Wilson ........................... 98/75 |
| 4,648,312 A | 3/1987 | Schad ........................... 98/75 |
| 5,183,435 A | 2/1993 | Galvez ........................ 454/18 |
| 5,185,261 A * | 2/1993 | Warrington .............. 435/290.1 |
| 5,269,829 A | 12/1993 | Meyer ............................... 71/9 |
| 5,295,554 A | 3/1994 | Cullen ......................... 180/236 |
| 5,297,377 A | 3/1994 | Cullen ........................... 53/527 |
| 5,345,744 A | 9/1994 | Cullen ....................... 53/128.1 |
| 5,396,753 A | 3/1995 | Cullen ........................... 53/567 |
| 5,408,810 A | 4/1995 | Cullen ........................... 53/567 |
| 5,417,736 A | 5/1995 | Meyer ............................... 71/9 |
| 5,426,910 A | 6/1995 | Cullen ....................... 53/128.1 |
| 5,452,562 A | 9/1995 | Cullen ........................... 53/428 |
| 5,461,843 A | 10/1995 | Garvin et al. ................. 53/434 |
| 5,632,798 A | 5/1997 | Funk et al. ....................... 71/9 |
| 5,830,358 A * | 11/1998 | White ........................ 210/650 |
| 5,894,713 A | 4/1999 | Cullen ........................... 53/436 |
| 5,960,612 A | 10/1999 | Cullen ........................... 53/436 |
| 6,302,778 B1 | 10/2001 | Andrews et al. .............. 454/16 |

* cited by examiner

Primary Examiner—David A. Redding
(74) Attorney, Agent, or Firm—Kolisch Hartwell, P.C.

(57) ABSTRACT

A method and means for drawing air through material by natural draft wherein air is drawn into one end of a container having the material therein and is sucked from the other end thereof by a wind powered rotary turbine ventilator.

10 Claims, 4 Drawing Sheets

METHOD AND MEANS FOR COMPOSTING ORGANIC MATERIAL BY NATURAL DRAFT

BACKGROUND OF THE INVENTION

1. Field of the Invention

This invention relates to a method and means for composting organic material and more particularly to a method and means for composting organic material by natural draft. Additionally, the invention relates to a method and means for drafting or drawing ambient air, without mechanical means, through any type of material in a bag or vessel.

2. Description of the Related Art

Many different methods have been previously provided for composting organic material. In U.S. Pat. No. 5,269,829, a method for accelerating aerobic decomposition of vegetative organic waste material is described wherein the organic material is placed in a plastic bag and a plurality of perforated pipes are then inserted into the bag with the pipes being in communication with the blower which blows air through the pipes, into the organic material and outwardly from the bag through a series of vents. The method described in U.S. Pat. No. 5,269,829 requires the placement of many vertically extending pipes in the bag and requires that the bag have a plurality of vent openings formed therein. Further, a blower is required for forcing air through the organic material. In some instances, a source of electricity is not available to power the blower.

A closely related composting method to that of U.S. Pat. No. 5,269,829 is disclosed in U.S. Pat. No. 5,417,736 wherein a plurality of elongated perforated conduits are positioned in the bag with the conduits being in communication with a source of air under pressure for forcing air through the perforated pipes and through the material in the plastic bag. A further method of composting which is closely related to U.S. Pat. No. 5,417,736 is disclosed in U.S. Pat. No. 5,632,798 which is a continuation-in-part application of U.S. Pat. No. 5,417,736. Yet another method of composting organic material, in a plastic bag is disclosed in U.S. Pat. No. 5,461,843 which also requires a blower for blowing air through one or more perforated pipes extending through a plastic ba g having the material to be composted therein.

SUMMARY OF THE INVENTION

A method and means for composting organic material by natural draft is disclosed. The method comprises: placing organic material in an elongated plastic bag having opposite ends; providing at least a first pipe having inlet and discharge ends; inserting the first pipe into one end of the bag so that the inlet end of the first pipe is in communication with a source of air and so that the discharge end of the first pipe is positioned in the interior of the bag; providing at least a second pipe having inlet and discharge ends; inserting the second pipe into the other end of the bag so that the inlet end of the second pipe is positioned in the interior of the bag and so that the discharge end of the second pipe is positioned outwardly of the bag; providing an air driven rotary turbine ventilator having an intake end and a discharge end; and connecting the discharge end of the second pipe to the inlet end of the ventilator whereby movement of air will cause the ventilator to rotate to draw air through the first pipe, through the organic material in the bag, through the second pipe and through the ventilator. Preferably, the ventilator is provided with a filter to filter the air being discharged therefrom to remove odors therefrom. Preferably, during the placement of the organic material in the plastic bag, air channels in the form of flutes are formed in the organic material according to the disclosure of U.S. Pat. No. 5,426,910. In some cases, a perforated pipe may be extended between the first and second pipes if so desired so that the discharge end of the first pipe is connected to the inlet end of the second pipe. Further, in some situations, it may be desirable to power the ventilator should there be an absence of wind for any appreciable time.

A principal object of the invention is to provide an improved method of composting organic material in a plastic bag.

A further object of the invention is to provide an apparatus for composting organic material in a plastic bag through the use of natural draft;

Still another object of the invention is to provide a method and means of a type described which does not require a powered blower for blowing air through the organic material.

Still another object of the invention is to provide a method and means whereby air is drawn or sucked through the organic material in the plastic bag by natural draft.

These and other objects of the invention will be apparent to those skilled in the art.

DESCRIPTION OF THE PREFERRED EMBODIMENT

Figure 1:
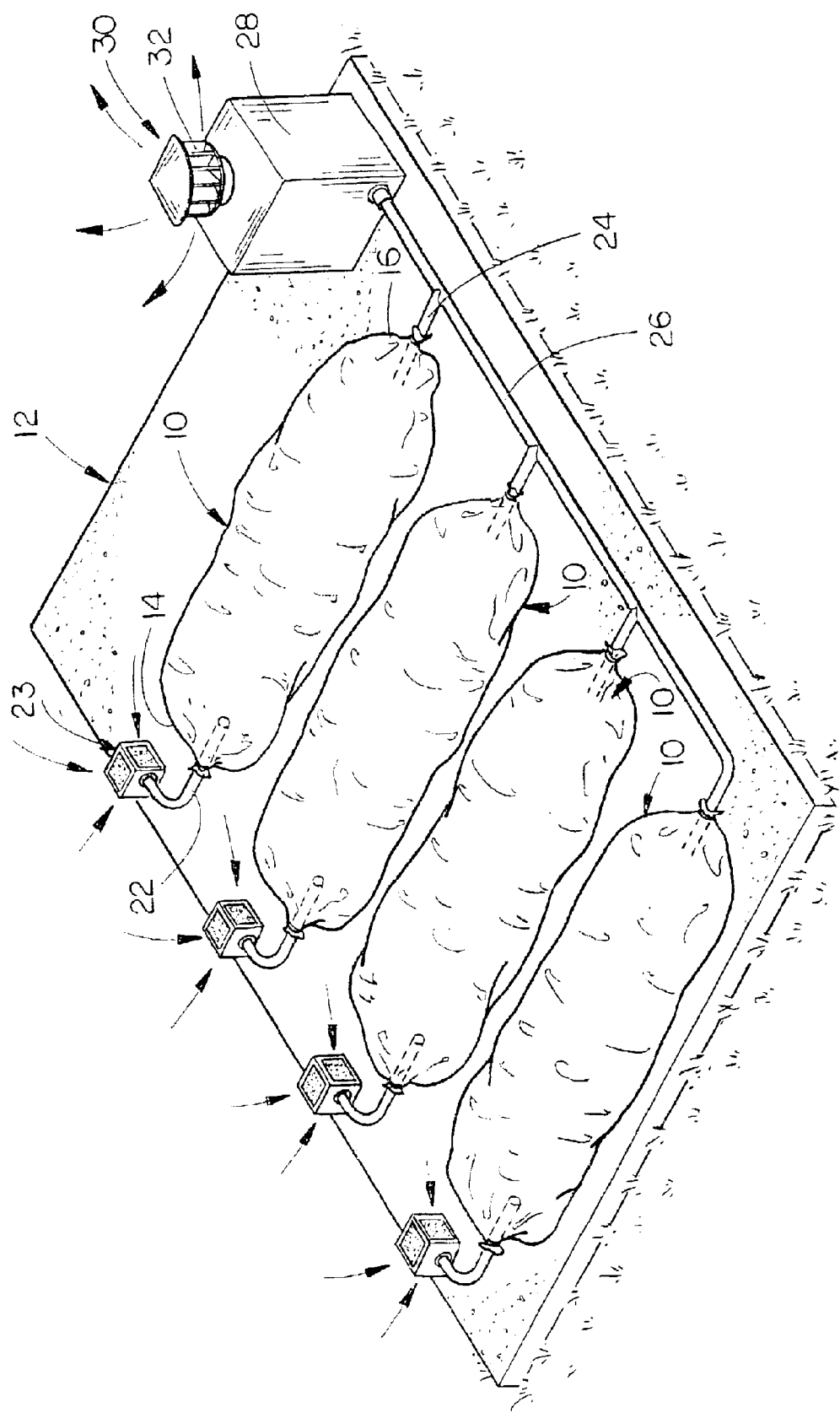
FIG. 1 is a perspective view illustrating a plurality of plastic bags filled with organic material.

In FIG. 1, a plurality of plastic bags 10 are illustrated as being positioned on a concrete slab or other hard surface 12. The bags 10 are constructed of a conventional white or clear plastic material such as that used with agricultural bagging machines such as disclosed in U.S. Pat. Nos. 5,295,554; 5,297,377; 5,345,744; 5,396,753; 5,408,810; 5,426,910; 5,452,562; 5,894,713; and 5,960,612.

Figure 3:
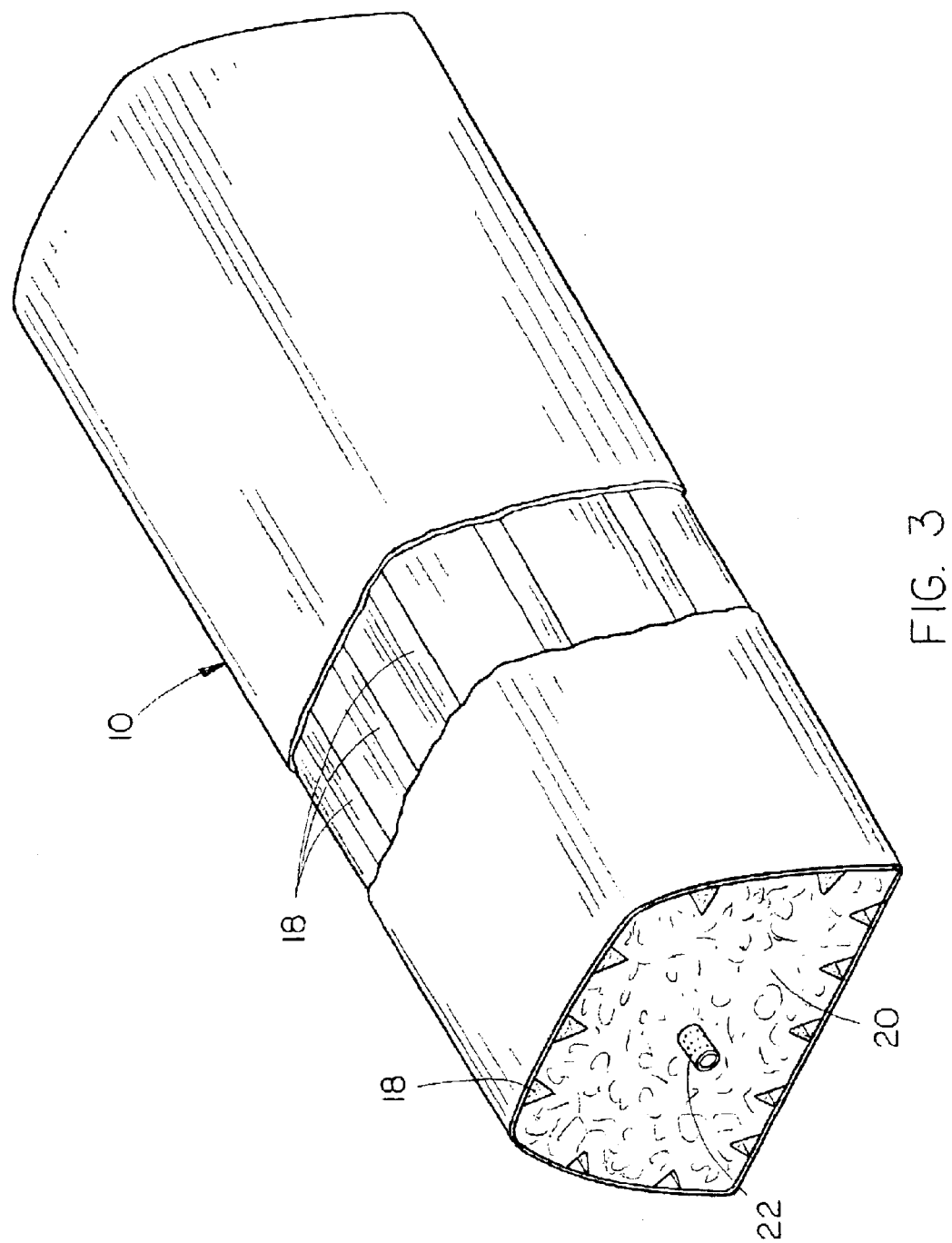
FIG. 3 is a perspective view of one of the plastic bags having organic material therein.

The bags are filled with organic material to be composted through the use of the bagging machines described above and will be described as including ends 14 and 16. During the filling of the bags, it is preferred, but not necessary, that a plurality of air channels 18 (FIG. 3) be formed in the compost material 20 by way of the apparatus disclosed in U.S. Pat. No. 5,426,910. An air inlet pipe 22 extends into end 14 of bag 10 so that the discharge end thereof is positioned in the interior of the bag. Preferably, that portion of the inlet pipe 22 which is positioned within the bag 10 is perforated. The inlet end of air inlet pipe 22 is preferably connected to an air inlet housing 23 which is preferably screened or perforated, as illustrated in FIG. 1, to permit air to enter therein and to flow through the pipe 22.

Figure 2:
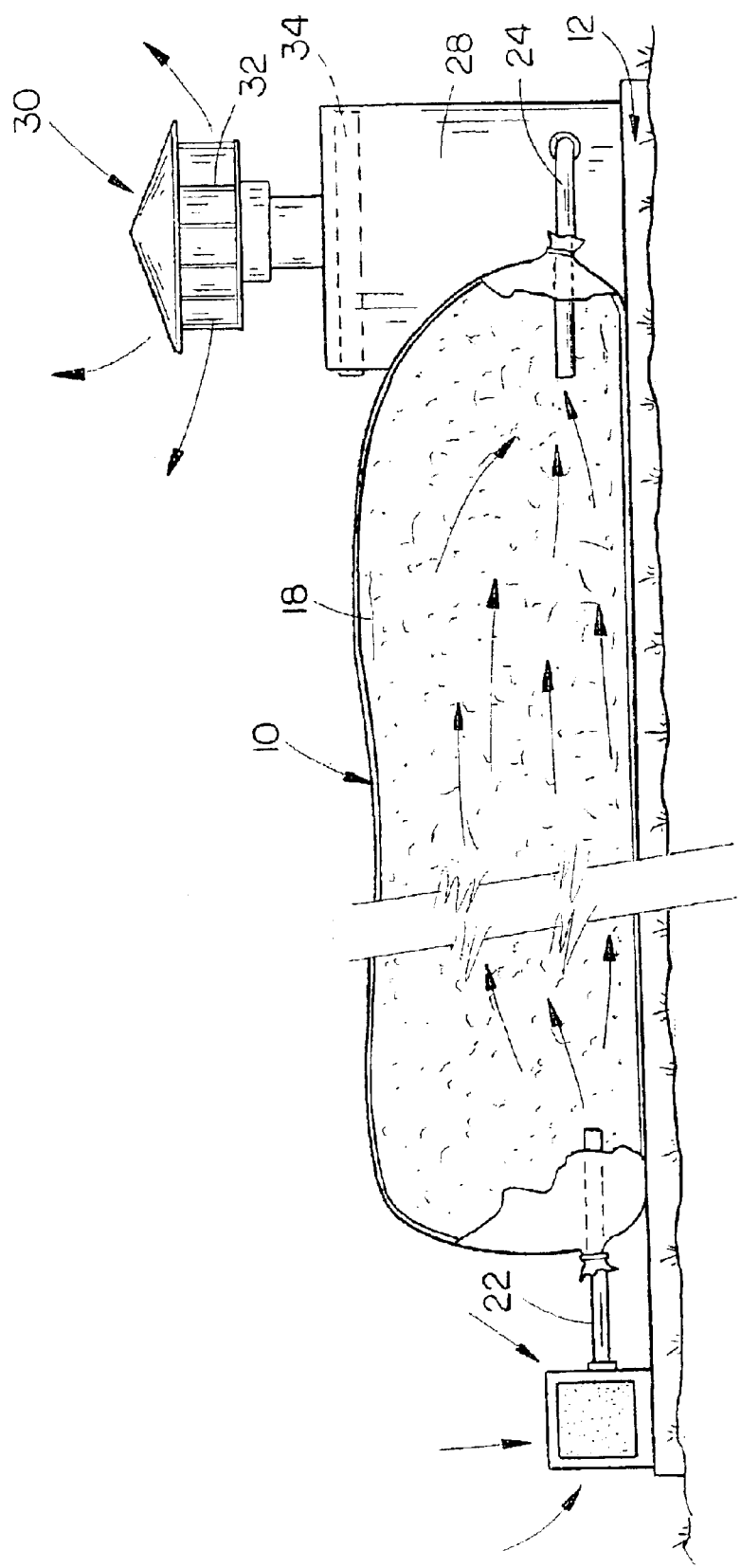
FIG. 2 is a partial sectional view of one of the plastic bags having organic material therein together with its relationship to an air intake and a rotary turbine ventilator.

An air outlet pipe 24 extends into end 16 of bag 10, as illustrated in FIG. 1, so that the inner end thereof is disposed in the interior of the bag 10 (FIG. 2). Preferably, that portion of the pipe 24 which is positioned within the bag 10 is perforated. In those situations where more than one bag 10 is being utilized, such as illustrated in FIG. 1, pipe 24 is connected to a manifold pipe 26 which extends to a turbine housing 28. Although it is preferred that the system be utilized to compost organic material in a plurality of bags, the system will work equally as well with a single bag.

A conventional wind driven or operated rotary turbine ventilator 30 is positioned on the upper end of the housing 28. Ventilator 30 includes a plurality of rotatable vanes 32 which are rotated by wind or air so that air is discharged from the ventilator 30, as illustrated in FIGS. 1 and 2, in conventional fashion. Typical rotary ventilators are disclosed in U.S. Pat. Nos 2,469,096; 5,183,435; and 6,302,778. Preferably, a filter 34 is positioned in the housing 26 between the intake and discharge ends thereof to filter the air passing therethrough to prevent odors being emitted into the atmosphere.

In use, the bags 10, if more than one bag is being composted, are arranged on the concrete slab 12 with the inlet pipes being extended into the ends 14 of the bags 10 as previously described and as illustrated in FIG. 1. The ends 14 of the bags are closed around the pipes 22 by any convenient means. The discharge pipes 24 are positioned in the bags as previously described and as illustrated in FIG. 1 with the ends of the bags being closed around the pipes by any convenient method. Wind causes the rotation of the vanes 32 of the ventilator 30 to draw or suck air inwardly through the air inlet housings 23, through the inlet pipes 22, through the organic material in the bag 10, outwardly through the pipes 24, into the pipe 26 and into the inlet end of the ventilator housing 28, and outwardly through the discharge end of the ventilator 30, as illustrated by the arrows in FIGS. 1 and 2. As the air passes through the housing 26, it is filtered by the filter 34 to remove odors therefrom.

It can be seen that a means has been provided for supplying air to the organic material in the bags 10 to aid in the composting thereof with the passage of air therethrough being accomplished by natural draft through the use of the ventilator 30. Further, as the temperature of the organic material in the bags 10 begins to rise through the composting action and through the radiation action of the sun through the clear plastic bags, air will tend to pass through the organic material and outwardly through the ventilator 30. In some cases where there is an absence of wind for prolonged periods of time, which is not likely, the ventilator 30 may be powered by an electric motor or other suitable powering means.

Figure 4:
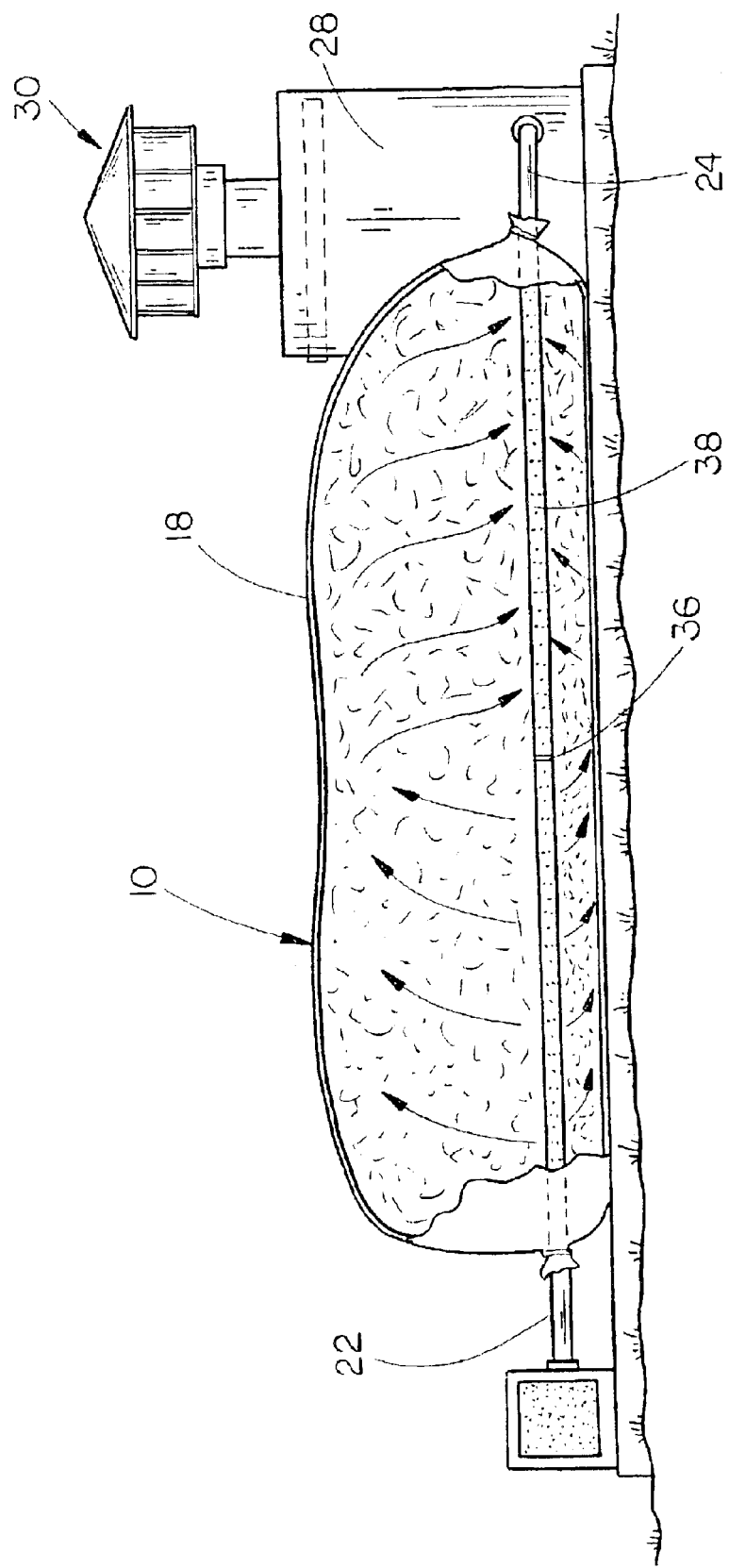
FIG. 4 is a view similar to FIG. 2 except that a perforated pipe extends through the length of the bag.

As the air is drawn or sucked through the organic material in the bags 10, the air tends to move through the channels 18 which aids in aerating the organic material in the bags. In some cases, it may be desired to place an elongated perforated pipe 35 between the pipes 22 and 24 to further aid in the passage of air through the material in the bags, as seen in FIG. 4. In that situation, it is recommended that the perforated pipe 38 be blocked at the middle thereof by obstruction 36 so that air entering the inlet side of the perforated pipe 38 will be forced outwardly from the perforated pipe at end of the bag, as illustrated by arrows in FIG. 4, and will be drawn into the perforated pipe 38 at the other end of the bag, as illustrated by arrows in FIG. 4. In other words, a blockage or obstruction 36 at the center of the perforated pipe 38 prevents the air from travelling the complete length of the pipe 38 without being directed outwardly into the organic material.

Thus it can be seen that a novel means of composting organic material in a plastic bag through the use of natural draft has been provided.

Although the apparatus of this invention is ideally suited for drafting or drawing ambient air through compost material, the ambient air may be drawn or drafted through any type of material contained in either a bag or vessel. The applications may include drying, preserving, treating, filtering, storing, etc., and the materials can include wood chips, foodstuffs such as potatoes, cottonseeds, etc.

Thus it can be seen that the invention accomplishes at least all of its stated objectives.

I claim:

1. The method of composting organic material in an elongated plastic bag having opposite ends, comprising the steps of:

providing at least a first pipe having inlet and discharge ends;

inserting said first pipe is position outwardly of the bag and into one end of the bag so that said inlet end of said first pipe is in communication with a source of air and so that said discharge end of said first pipe is positioned in the interior of the bag;

providing at least a second pipe having inlet and discharge ends;

inserting said second pipe into the other end of the bag so that said inlet end of said second pipe is positioned in the interior of the bag and so that the discharge end of said second pipe is,.positioned outwardly of the bag;

providing an air-driven rotary turbine ventilator having an intake end and a discharge end;

and connecting said discharge end of said second pipe to said inlet end of said ventilator whereby movement of air will cause said ventilator to rotate to draw air through said first pipe, through the organic material in the bag, through said second pipe and through said ventilator.

2. The method of claim 1 wherein a plurality of bags are operatively connected to said ventilator.

3. The method of claim 1 wherein at least one perforated pipe extends between said first and second pipes.

4. The method of claim 3 wherein the interior of said perforated pipe is at least plugged in one location to create a discharge pipe portion and an intake pipe portion in said perforated pipe.

5. The method of claim 1 wherein the bag is comprised of a clear plastic material.

6. The method of claim 1 Wherein said ventilator is capable of being driven by either air power or motor power.

7. The method of claim 1 wherein an air filter is provided in said ventilator to filter the air being discharged therefrom.

8. The method of claim 1 wherein a plurality of air chambers are also provided in the bag to enhance the flow of air therethrough.

9. The method of claim 8 wherein at least some of the air channels are formed in the organic material adjacent the inner surface of the bag.

10. The method of claim 1 wherein at least one perforated pipe extends between said first and second pipes so that the discharge end of the first pipe is connected to the inlet end of the second pipe.

* * * * *